United States Patent
Ezoe (10) Patent No.: US 7,043,607 B2
(45) Date of Patent: May 9, 2006

(54) INFORMATION PROCESSING SYSTEM AND CACHE FLASH CONTROL METHOD USED FOR THE SAME

(75) Inventor: Kenji Ezoe, Tokyo (JP)

(73) Assignee: NEC Corporation, Tokyo (JP)

( * ) Notice: Subject to any disclaimer, the term of this patent is extended or adjusted under 35 U.S.C. 154(b) by 321 days.

(21) Appl. No.: 10/459,931

(22) Filed: Jun. 12, 2003

(65) Prior Publication Data

US 2003/0233513 A1    Dec. 18, 2003

(30) Foreign Application Priority Data

Jun. 12, 2002  (JP) ............................. 2002-170839

(51) Int. Cl.
*G06F 12/08*   (2006.01)
(52) U.S. Cl. ................................ 711/118; 712/2; 712/6
(58) Field of Classification Search .................... 712/2, 712/3, 18, 22, 24, 28, 31; 711/118
See application file for complete search history.

(56) References Cited

U.S. PATENT DOCUMENTS 5,123,095 A * 6/1992 Papadopoulos et al. ..... 712/218
5,276,848 A * 1/1994 Gallagher et al. .......... 711/121
5,418,973 A * 5/1995 Ellis et al. ...................... 712/3

* cited by examiner

*Primary Examiner*—Donald Sparks
*Assistant Examiner*—Jared Rutz
(74) *Attorney, Agent, or Firm*—Scully, Scott, Murphy & Presser, P.C.

(57) ABSTRACT

The vector unit 21 outputs a first flash address to the flash address array 24. The vector unit 31 outputs a second flash address to the flash address array 34. In the master unit 2, the flash address array 24 compares an address registered in a cache with the first flash address. In the slave unit 3, the flash address array 34 compares the address registered in the cache with the second flash address. When said first flash address coincides with said address registered in said cache, the flash address array 24 sends a first coincidence address to the address array 25. When said second flash address coincides with said address registered in said cache, the flash address array 34 sends a second coincidence address to the address array 25. A corresponding address of the address array 25 is flashed based on the first address sent from the flash address array 24 and based on the second address sent from the flash address 34. The cache control circuit 23 receives an END signal from the master unit 2 and an END signal from the slave unit 3. Thus, the flash process ends.

16 Claims, 9 Drawing Sheets

| OPERATION CODE | X FIELD | Y FIELD | Z FIELD |
|---|---|---|---|
|  |  | V y | V z |

FIG. 7

| TAG ADDRESS 25 BITS | INDEX ADDRESS 7 BITS | INTERBLOCK ADDRESS 8 BITS |
|---|---|---|

INFORMATION PROCESSING SYSTEM AND CACHE FLASH CONTROL METHOD USED FOR THE SAME

BACKGROUND OF THE INVENTION

The present invention relates to an information processing system and to a cache flash control method used for the same. More particularly, the present invention relates to a cache flash control method suitable for an information processing system adopting a vector scheme.

The delay of a clock distribution circuit has bottlenecked to respond recent increasing operation frequencies of information processing systems. As a result, it has become difficult to control different divisional units (such as CPUs (Central Processing Units) or LSIs (Large-scale Integrated circuits)) with clocks in phase.

One approach to solve the above-mentioned problem is to synchronize CPUs operated with asynchronous clocks, by software. For example, there is the method of utilizing hardware functions such as barrier sync/communication registers and dispatching plural processes divided by a compiler or manual specifications to CPUs installed with different OS (Operating Systems).

This method is premised on a group of processes operated with completely different timings. Hence, even if CPUs are clocked asynchronously, an incorrect problem in operation resulting from a hardware function does not occur. Such a scheme is realized in scalar-type parallel supercomputers.

The parallel processing support function employing the above-mentioned hardware can be realized more easily and inexpensively, compared with functions such as an increased clock rate of a microprocessor and expansion of a CPU-to-memory bandwidth. This approach can be generally performed to increase an apparent performance-to-cost ratio.

However, increasing the parallel process rate by software makes it difficult to parallelize programs. Specifically, the limit of parallelizing programs being not in parallel depends on the type of a program.

Moreover, even if programs can be arranged in parallel, it is very difficult to debug them, compared with programs not arranged in parallel. The debugging is performed by performance tuning, but requires a high-level skill on the parallel computer technology. Such a task has to be done every time hardware is up-graded.

Moreover, there is the problem in that an enormous amount of program resources are not fully drawn because of the above-mentioned reasons. Even if the technical problem on the parallel processing is overcome, there are many problems such as a shortage of human resources to employ it at a field site.

One of approaches for such a problem is the parallel processing by hardware and the specific is a product that is called a vector-type supercomputer. The vector scheme is one of parallel processing schemes (of SIMD (Single Instruction stream Multiple Data stream) type), each in which plural sets of data are subjected to similar operation/memory access.

The section storing plural sets of data is called a vector register. The command indicating the same operation, the same memory access, and the same transfer to all sets of element data in the vector register is called a vector command. For example, operation indication objective elements of 128 are set to the VL (vector length register) in accordance with the LVL (Load VL) command, as shown below.

LVL VL<–128
VADD V7<–V5+V4

Thereafter, the 128 elements of V5 or V4 are added and set to the 128 element areas of V7, in accordance with the VADD (vector addition) command.

As described above, the vector scheme does not require synchronization between processes so that the parallel processing can be realized with an extension of a single CPU. The vector scheme is time-proven as a parallelizing technique. The automatic vector compiler technique has been developing in a product level.

Even if the vector unit, which executes the vector commands, is realized so as to extend over plural asynchronous operation units, the CPU is synchronized by hardware, like the vector computer. Thus, a programmer can easily realize the high-speed operations by the parallel processing.

In order to realize an effective performance gain, the effective vector scheme requires acquiring a bandwidth between the CPU and the memory appropriate to the effective performance. However, the number of pins per LSI, connectable to a memory, is limited. One approach for such a problem is to split the vector unit into plural LSIs, thus putting to some extent a brake on the increasing pins of the CPU.

However, even in this approach, when the operation clock reaches several hundreds MHz, an increase in the clock skew makes it difficult to operate the split LSIs in sync with the clocks.

Figure 6:
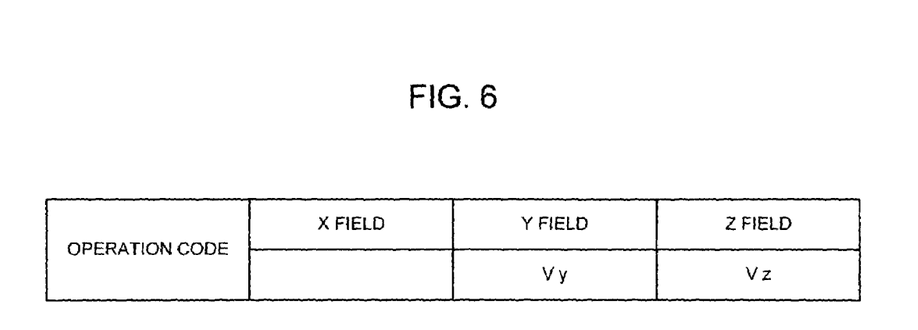
FIG. 6 is a diagram showing an instruction specification for a VSC command.

The conventional information processing systems described above has the following problems on the VSC (vector scan) command when the vector unit is realized over plural asynchronous operation units The VSC command is very important in the vector-type computers. The specification of the VSC command will be now explained by referring to FIG. 6. The memory stores as an address the content of the vector register Vy specified in the y field and stores the content of the vector register Vz specified in the corresponding z field.

First, the vector-type CPU command process will be briefly explained here. In order to send a large volume of data at a time, in accordance with the vector command, the memory is directly accessed, without accessing a cache memory (hereinafter referred to as a cache). However, the conventional program contains a scalar operation and a vector operation in a mixed state. The scalar operation is performed using the data in the cache.

The coherency between the cache and the memory is maintained by considering that the case where common data is used in the scalar operation and the vector operation. In the case of the scalar store command, the store data is simultaneously written into the cache and the memory. In the case of the vector store command, while data is being directly written (or stored) into the memory, both the address stored in the cache and the vector store address is compared. When the address matches the vector store address, the corresponding cache line is invalidated (or flashed).

Here, the configuration of the cache required in the present invention will be explained by referring to FIG. 8. Now, it is assumed that the number of bits of an address is 40 bits and that the cache has 64 KB, a two-way set associative, and a line size of 256 B. In the case of the cache shown in FIG. 7, the interblock address is 8 bits (because 256 B=$2^8$ B when the minimum access unit is 1 B). The index address (the line address of the cache) is 7 bits (because $2^7$ B=(128=(32 KB per one way)/(256 B per line)) and the cash has a two-way, 64 KB configuration). The tag address is 25 bits (=40−8−7).

Figure 8:
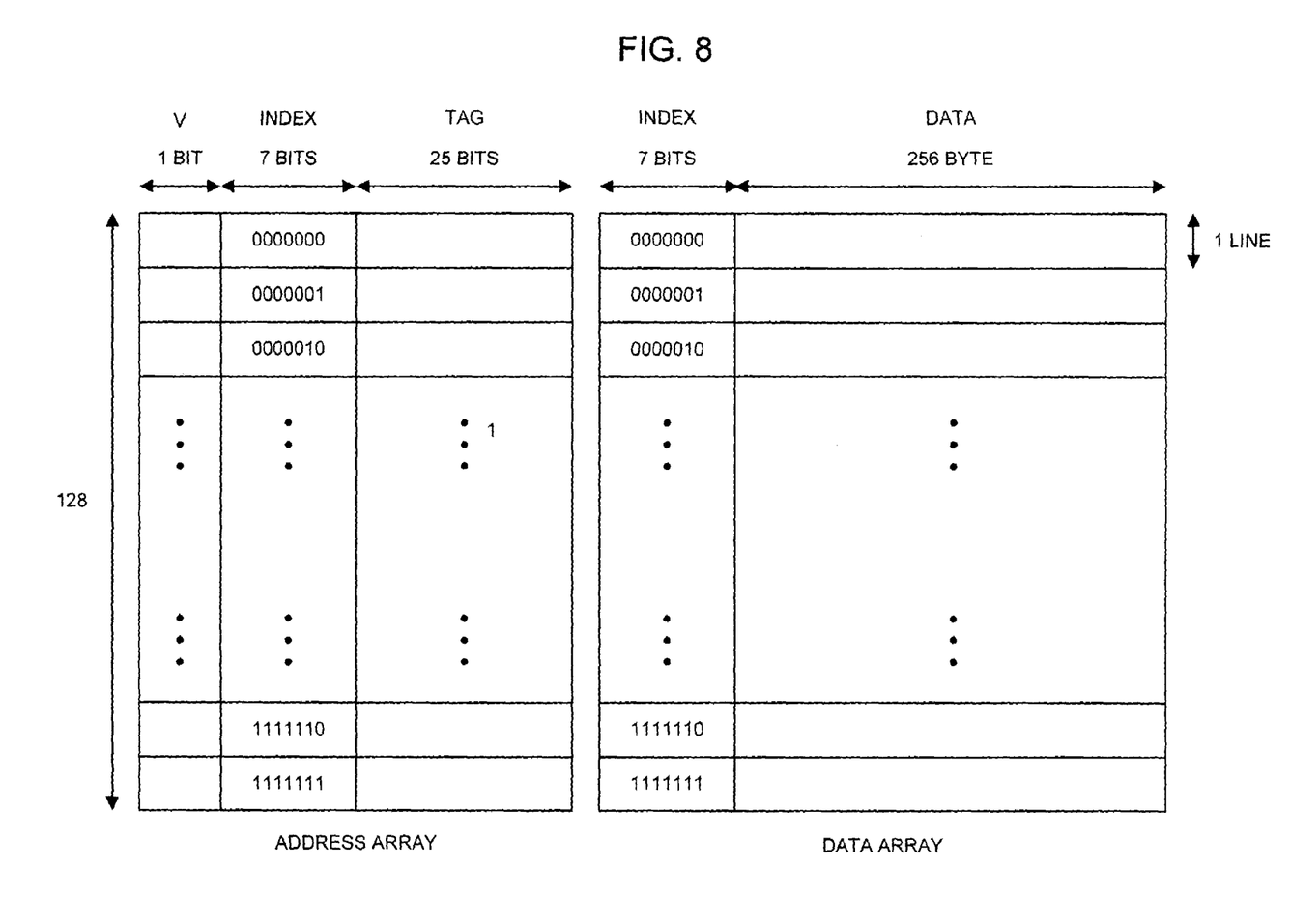
FIG. 8 is diagram explaining the configuration of a cache.

Referring to FIG. 8, a cache is formed of an address array (hereinafter referred to as AA) and a data array (hereinafter referred to as DA). AA stores a tag address. DA stores data. Each line has a VALID bit (hereinafter referred to as a V bit) representing that a line is effective. In this case, the cache line is valid with V bit=1 but is invalid with V bit=0.

Figure 9:
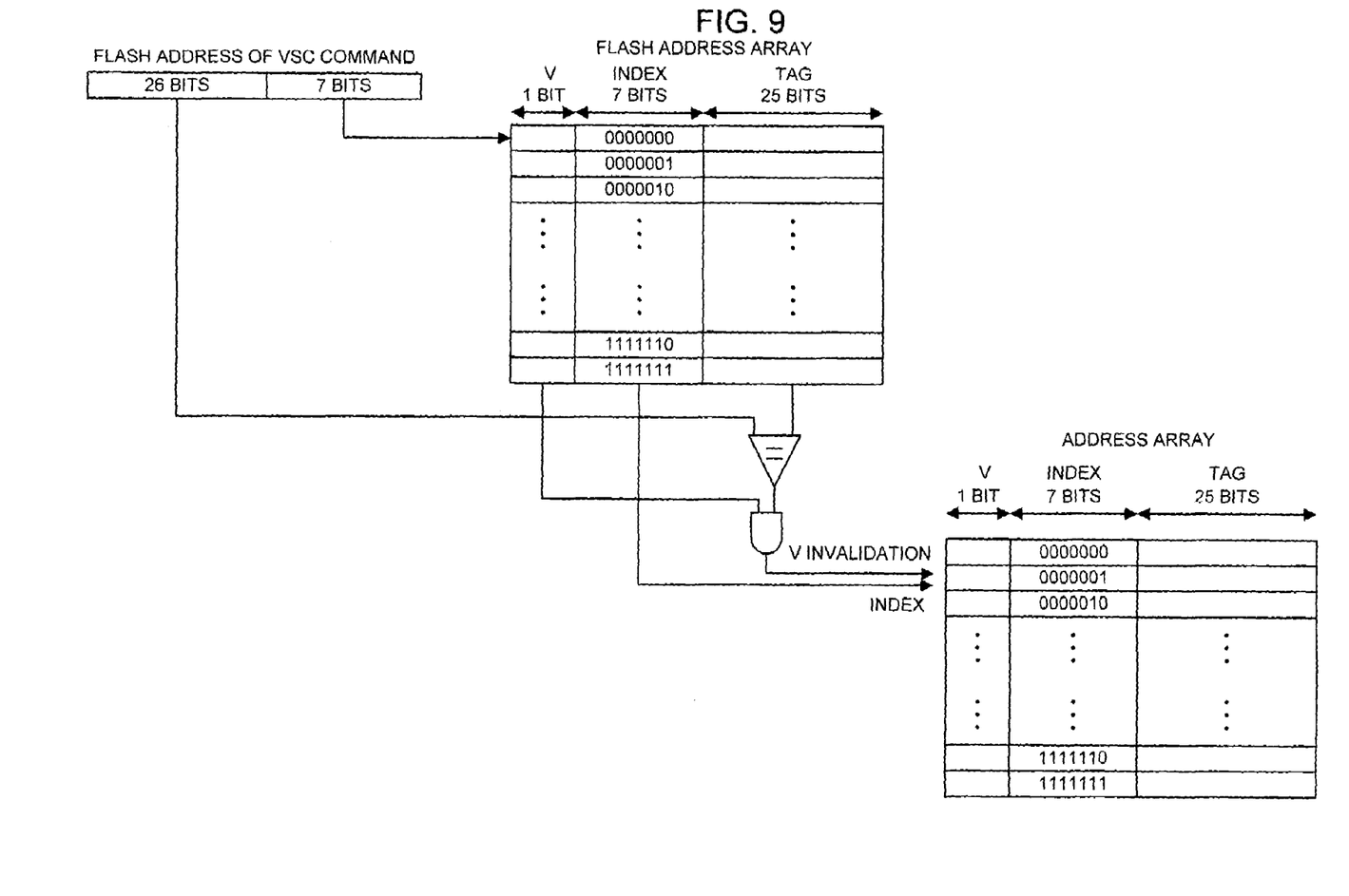
FIG. 9 is a diagram explaining a cache flash process.

Next, the cache flash process of the VSC command will be explained by referring to FIG. 9. The cache flash is the process of invalidating the corresponding cache line by a memory direct-accessing command, such as a vector store command, when a mismatch occurs between data of a cache and data in a memory.

Figure 7:
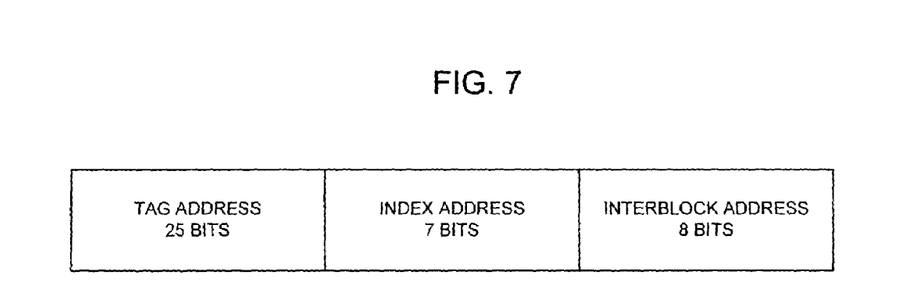
FIG. 7 is a diagram showing an example of bits of an address.

Because the cache flash is performed every cache line, it is unnecessary to subject the interblock address (lower 8 bits of 40 bits) to comparison, as shown in FIG. 7. The upper 32 bits of the store address (hereinafter the store address used for a flash process of the vector command is referred to as a flash address) of the VSC command may be merely subjected to comparison.

The lower 7 bits of the flash address of the VSC command is compared with the index address of 7 bits of the flash address array (a copy of an address array used in a flash process, hereinafter referred to as FAA). The tag address 25 bits and V bit of a corresponding line are output from FAA.

The tag address of 25 bits, output from FAA, is compared with the upper 25 bits of the flash address of the VSC command. As a result, when all bits match each other and the V bit is 1, V bit of the corresponding index address of AA is set to 0 and the cache line is flashed.

Figure 10:
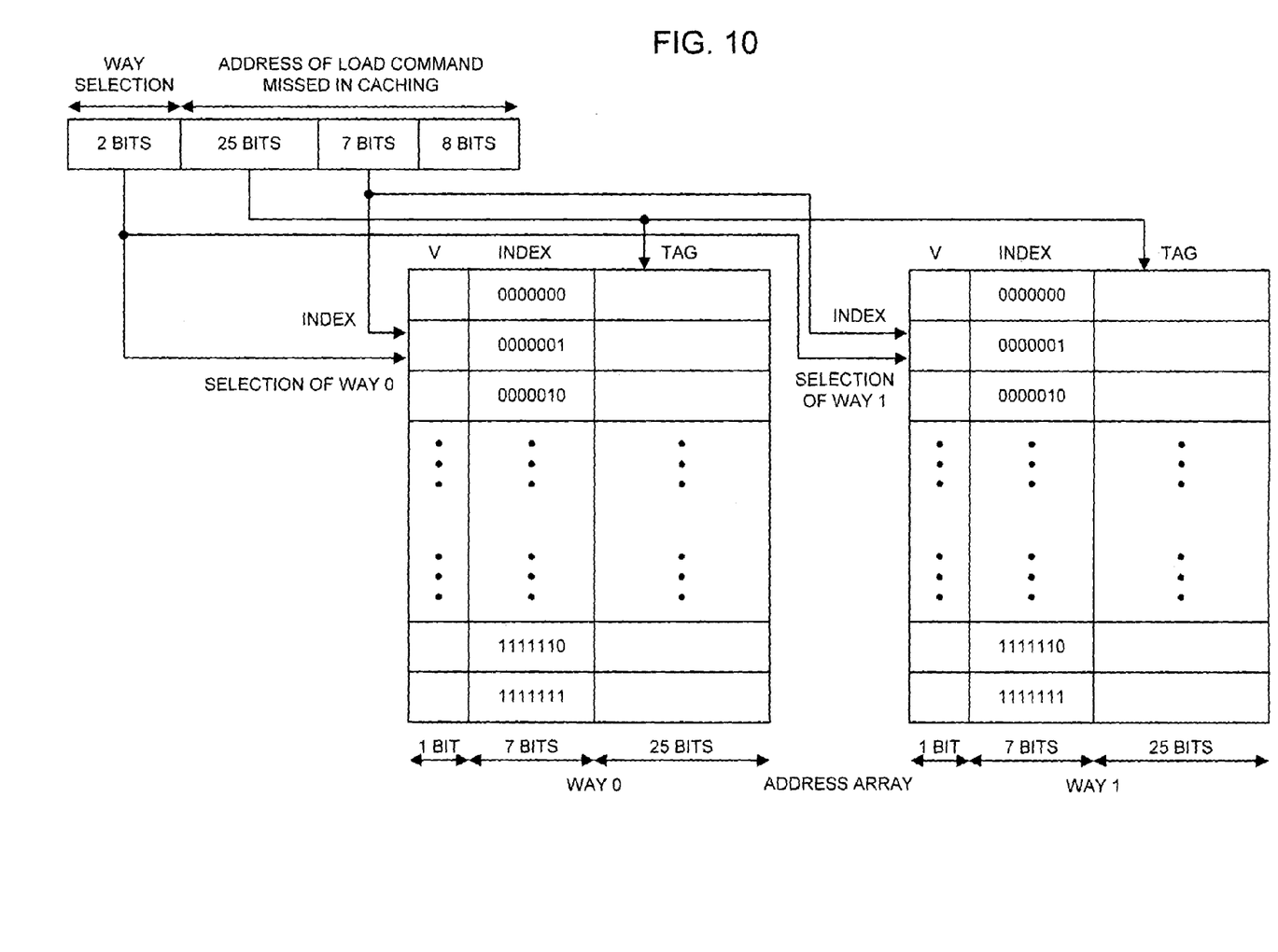
FIG. 10 is a diagram explaining a cache updating process.

Next, the cache updating process (updating process) at a cache miss time will be explained by referring to FIG. 10. When a cache miss occurs, the content of the cache has to be updated. Let us now consider updating of AA. In the case of the cache configuration in 2 ways or more, the way to be updated by a cache push-out algorithm (e.g. LRU (Least Recently Used)) is determined. The 2-way is represented with 2 bits.

The lower 8 bits of the address of 40 bits of the load command in a cache-miss state are an interblock address and hence become unnecessary. The next lower 7 bits correspond to an index address of a cache line to be updated and a tag address of 25 bits is written to a corresponding line.

The cache line updated as V bit=1 is valid. Thus, the updating process is completed. By the way, because FAA is a copy of AA, FAA has to be updated at the same time when AA is updated.

Figure 5:
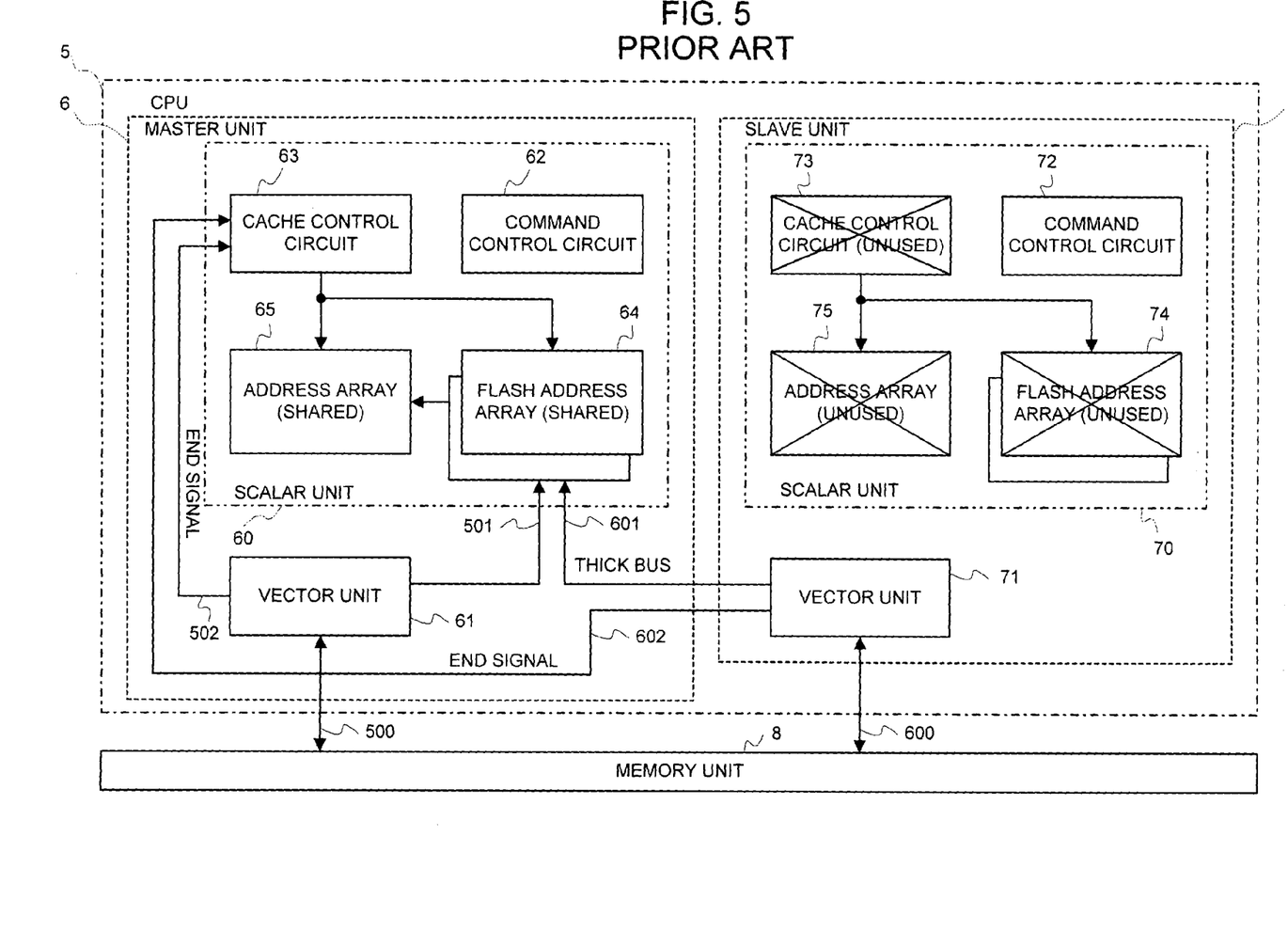
FIG. 5 is a block diagram illustrating in detail the configuration of a conventional CPU.

In consideration of such things, the conventional technique where a vector unit is realized in plural asynchronous operation units will be explained below by referring to (b) part of FIG. 2 and FIG. 5. As shown in FIG. 5, CPU 5 is formed of a master unit 6 and a slave unit 7. In this configuration, the cache has to be shared to maintain the coherency of the cache and simplify the control.

In the case of a shared cache, the address array 65 only in the master unit 6 is used. In such a configuration, when the VSC command is executed, the store data Vz is written into the memory unit 8, using the signal line 500 to the vector unit 61 in the master unit 6 and using the signal line 600 to the vector unit 71 in the slave unit 7 (S31 in (b) part of FIG. 2).

Figure 2:
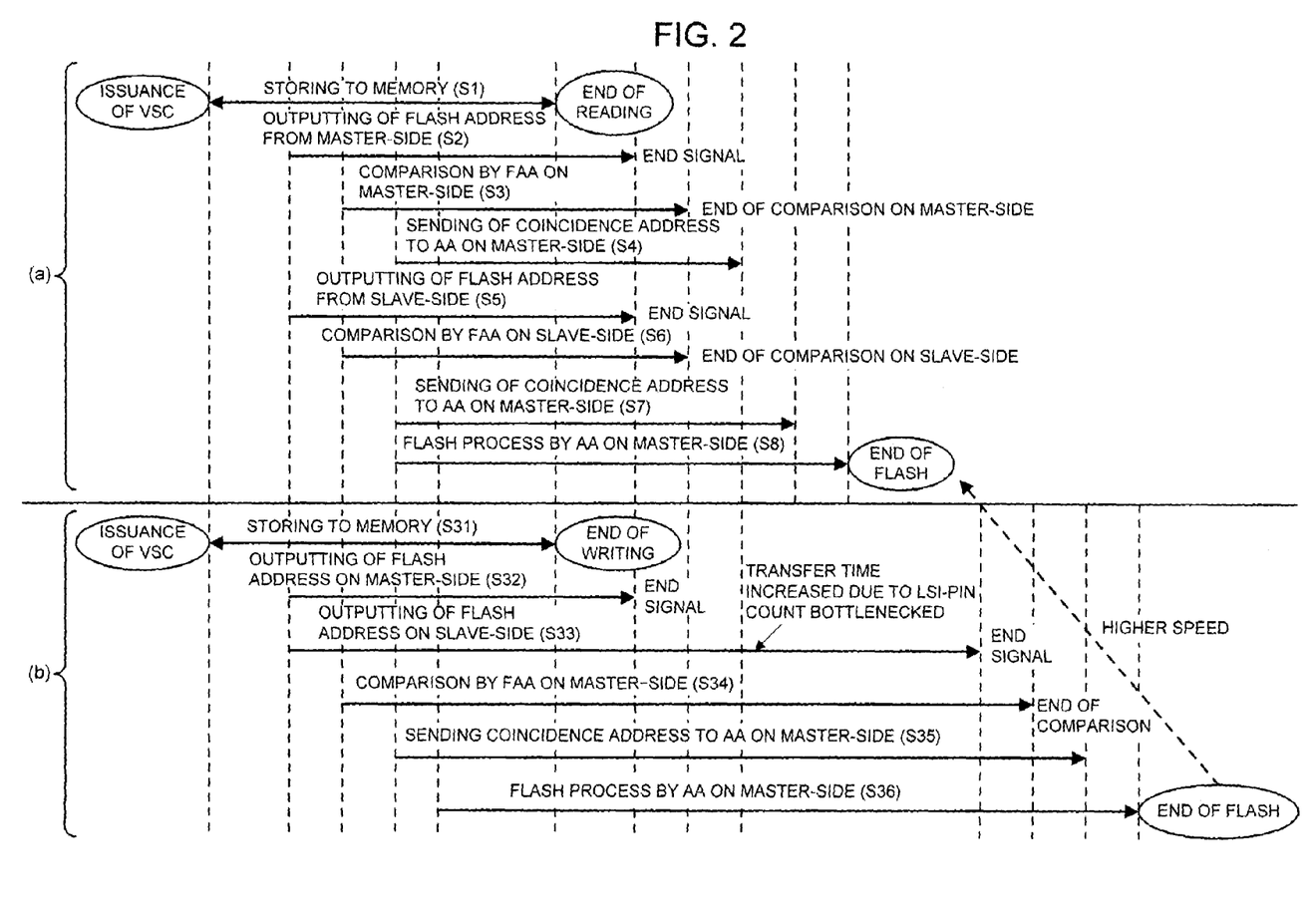
FIG. 2 is a time chart showing a cache flash control operation according to an embodiment of the present invention.

At the same time, the vector unit 61 outputs the flash address Vy to FAA 64 using the signal line 501 (S32 in (b) part of FIG. 2). The vector unit 71 outputs the flash address to FAA 64, using the signal line 601 (S33 in (b) part of FIG. 2). When the flash address has been output to the last vector element, the vector unit 61 outputs the END signal to the cache control section 63 using the signal line 502. The vector unit 71 outputs the END signal to the cache control section 63 using the signal line 602.

The FAA 64 in the master unit 6 compares the address stored in the cache with the flash address (S34 in (b) part of FIG. 2). When both the addresses match each other, a coincidence address is sent to the AA 65 (S35 in (b) part of FIG. 2).

Finally, a corresponding address of the AA 65 is flashed. The cache control circuit 63 receives the END signals from the master unit 6 and the slave unit 7. Thus, the flash process ends (S36 in (b) part of FIG. 2).

It is assumed that both the master unit 6 and the slave unit 7 can process in vector elements of 256. The signal line 601 interconnects the vector unit 71 and the FAA 64. When a flash address being one element per 1T (one clock) is output, signal lines corresponding to 32 bits (=an index address of 7 bits+a tag address of 25 bits) are required.

In this case, if the number of vector elements is 256, the complete outputting of a flash address takes the time period of 256 T, which is impractical processing rate. Until the flash address and the cache address of the VSC command are completely compared, the cache flash process of the next command and the updating process of a cache occurring at a cache miss time are not performed. Consequently, a high-rate address comparing process is essential to improve the performance.

To process n vector elements per 1T at high-rate, the signal lines 601 of (32 bits×n) is required. This leads to a sharply increased number of pins of a LSI. This problem spoils the advantage that the vector unit split into plural LSIs acts as a considerable brake on an increasing number of pins of the CPU.

SUMMARY OF THE INVENTION

The present invention is made to solve the above-mentioned problems. An object of the present invention is to provide an information processing system capable of performing fast address comparison between a cache address and a store address of the VSC command, without greatly increasing the number of LSI pins.

Another object of the present invention is to provide a cache flash control method used for the information processing system.

According to an aspect of the present invention, an information processing system comprises a vector unit divided into a plurality of asynchronous operation units and performs cache flash control to invalidate a cache line by a command directly accessing a memory when a mismatch between data in said memory and data in a cache memory occurs. The plurality of asynchronous operation units divisionally compare a flash address representing a store address to the memory with an address to the cache memory.

According to another aspect of the present invention, an information processing system comprises a vector unit divided into a master unit and a slave unit and performs cache flash control to invalidate a cache line by a command directly accessing a memory when a mismatch between data in said memory and data in a cache memory occurs. The master unit and the slave unit divisionally compare a flash address representing a store address to the memory with an address to the cache memory.

In a cache flash control method according to another aspect of the present invention, with a vector unit divided into a plurality of asynchronous operation unit, cache flash control is performed to invalidate a cache line by a command directly accessing a memory when a mismatch between data in the memory and data in a cache memory occurs. The cache flash control method comprises the step of divisionally comparing a flash address representing a store address to the memory with an address to the cache memory by means of the plurality of asynchronous operation units.

In a cache flash control method according to another aspect of the present invention, with a vector unit divided into a master unit and a slave unit, cache flash control is performed to invalidate a cache line by a command directly accessing a memory when a mismatch between data in said memory and data in a cache memory occurs. The cache flash control method comprises the step of divisionally comparing a flash address representing a store address to the memory with an address to the cache memory by means of the master unit and the slave unit.

That is, in the cache flash control method for an information processing system, the cache flash process is performed by divisionally comparing a flash address of a VSC (vector scatter) command with a cash address by means of the plurality of units and then outputting a coincidence address only to the address array in the master unit.

In the system adopting a vector unit divided into plural asynchronous operation units, the cache flash control of the VSC command between different asynchronously operating units, is performed without largely increasing the number of pins of an LSI. Thus, the cache address and the store address of the VSC command can be compared at high rate.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments according to the present invention will be described below in detail by referring to the attached drawings.

Figure 1:
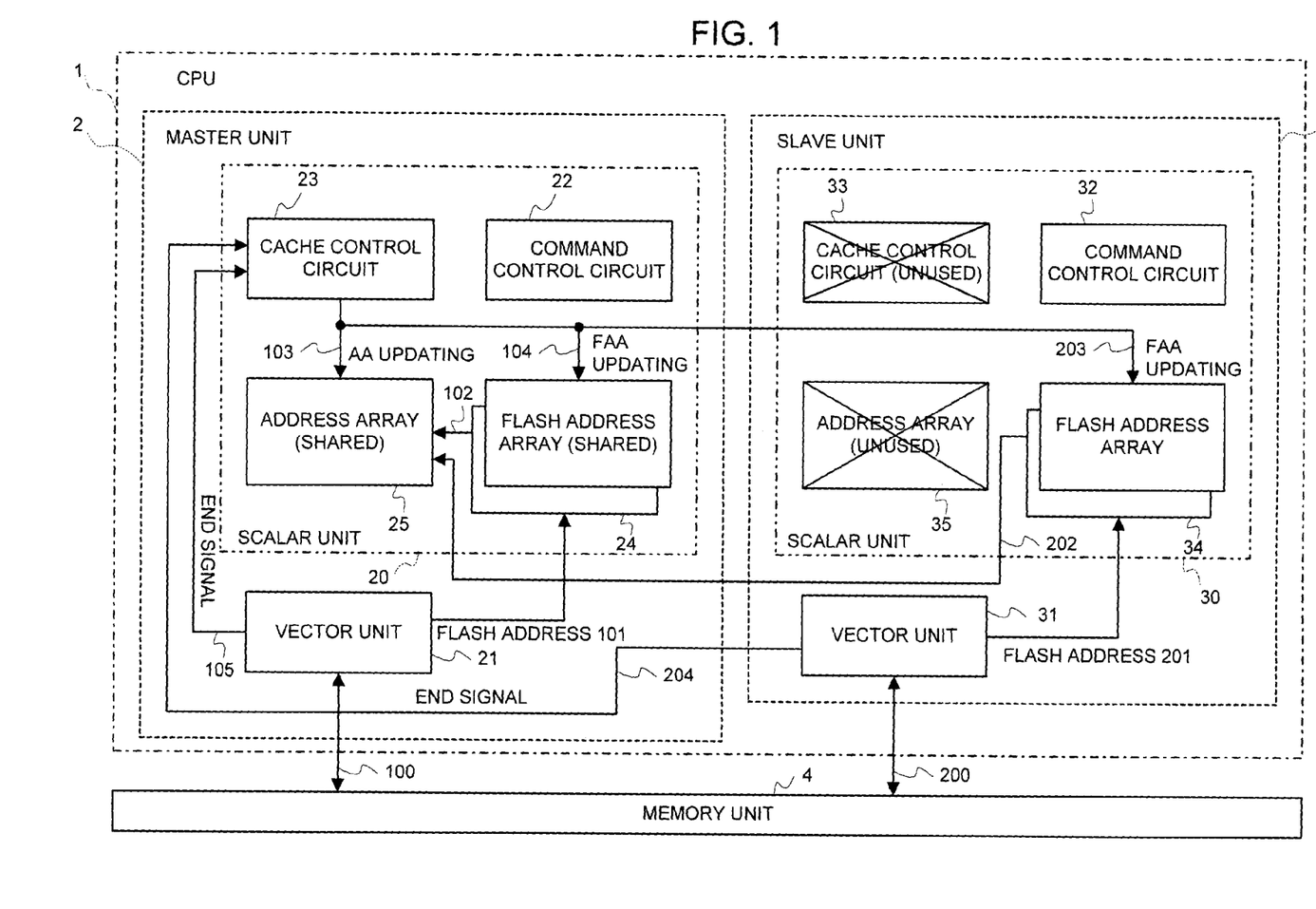
FIG. 1 is a block diagram illustrating the configuration of the CPU in an information processing system, according to an embodiment of the present invention.

FIG. 1 is a block diagram illustrating the configuration of a CPU (Central Processing Unit) in an information processing system according to an embodiment of the present invention. Referring to FIG. 1, one CPU 1 is divided into a master unit 2 and a slave unit 3, each being a asynchronous operation section. The master unit 2 and the slave unit 3 are often formed of LSIs, respectively. In future, the same LSI may contain plural asynchronously-operated units, with clocks repetitive at high speed.

Referring to FIG. 1, the CPU 1 is divided into the master unit 2 and the slave unit 3 and is externally connected to a memory unit 4. The master unit 2 consists of a scalar unit 20 and a vector unit 21. The slave unit 3 consists of a scalar unit 30 and a vector unit 31. Numerals 100 to 105 and 200 to 204 represent signal lines, respectively.

The scalar unit 20 includes a command control circuit 22, a cache control circuit 23, a flash address array 24, and an address array 25. The scalar unit 30 includes a command control circuit 32, a cache control circuit 33, a flash address array 34, and an address array 35. In this embodiment, the cache control circuit 33 and the address array 35 in the scalar unit 30 are in unused condition.

FIG. 2 is a time chart showing a cache flash control operation according to an embodiment of the present invention. The cache flash control in the embodiment will be explained below by referring to FIGS. 1 and 2. Here, AA represents an address array. FAA represents a flash address array being a copy of AA to be used in the flash process. A store address of the VSC command is called a flash address.

When the VSC command is executed, the vector unit 21 in the master unit 2 writes store data Vz to the memory unit 4 via the signal line 100. Meanwhile, the vector unit 31 in the slave unit 3 writes store data Vz to the memory unit 4 via the signal line 200 (S1 in (a) part of FIG. 2).

At the same time, the vector unit 21 in the master unit 2 outputs the flash address Vy to FAA 24 via the signal line 101 (S2 in (a) part of FIG. 2). The vector unit 31 in the slave unit 3 outputs the flash address Vy to FAA 34 via the signal line 201 (S5 in (a) part of FIG. 2).

When the flash address up to the final vector element has been output, the vector unit 21 outputs an END signal to the cache control section 23 via the signal line 105. Meanwhile, the vector unit 31 outputs an END signal to the cache control section 23 via the signal line 204.

In the master unit 2, the FAA 24 compares an address registered in the cache with the flash address (S3 in (a) part of FIG. 2). In the slave unit 3, the FAA 34 compares an address registered in the cache with the flash address (S6 in (a) part of FIG. 2).

When there is a match between both the addresses in comparison, the FAA 24 outputs a coincidence address to the AA 25 (S4 in (a) part of FIG. 2). When there is a match between both the addresses in comparison, the FAA 34 outputs a coincidence address to the AA 25 (S7 in (a) part of FIG. 2).

Finally, the corresponding address in the AA 25 is flashed based on the address sent from the FAA 24 and based on the address sent from the FAA 35. Moreover, the cache control circuit 23 has received the END signal from the master unit 2 and the END signal from the slave unit 3. In such a state, the flash process ends (S8 in (a) part of FIG. 2).

The updating process at the cache miss time is performed to the AA 25 via the signal line 103, to the FAA 24 via the signal line 104, and to the FAA 34 via the signal line 203.

Figure 3:
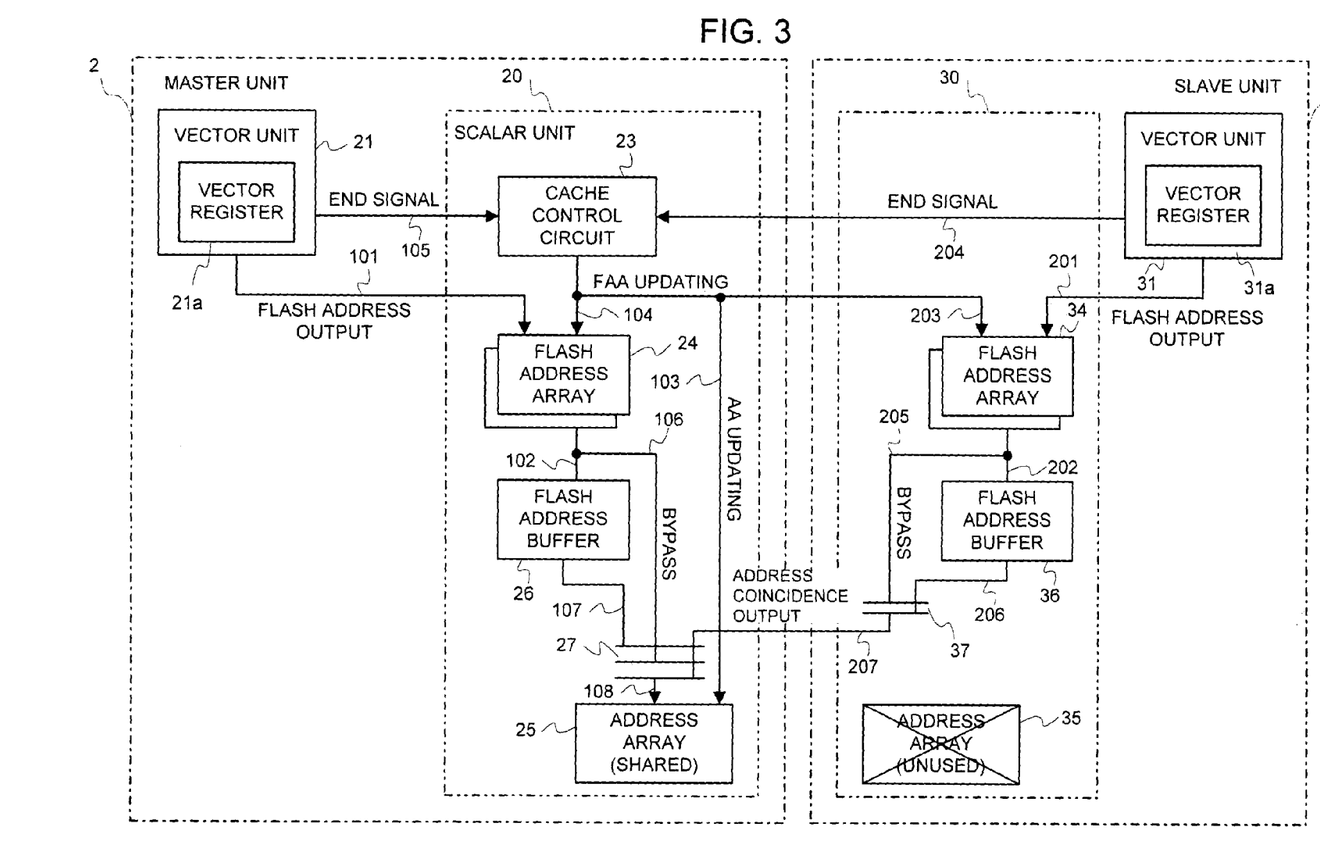
FIG. 3 is a block diagram illustrating in detail the configuration of the CPU according to an embodiment of the present invention.

FIG. 3 is a block diagram illustrating the detailed configuration of the CPU 1 according to the embodiment of the present invention. Referring to FIG. 3, the master unit 2 consists of a scalar unit 20 and a vector unit 21. The scalar unit 20 includes a cache control circuit 23, a FAA 24, an AA 25, a flash address buffer (hereinafter referred to as FABF) 26, and a selector 27. The vector unit 21 includes a vector register 21a.

The slave unit 3 includes a scalar unit 30 and a vector unit 31. The scalar unit 30 includes a FAA 34, an AA 35 (in unused state), a FABF 36, and a selector 37. The vector unit 31 includes a vector register 31a. Numerals 101 to 108 and 201 to 207 represent signal lines, respectively.

Figure 4:
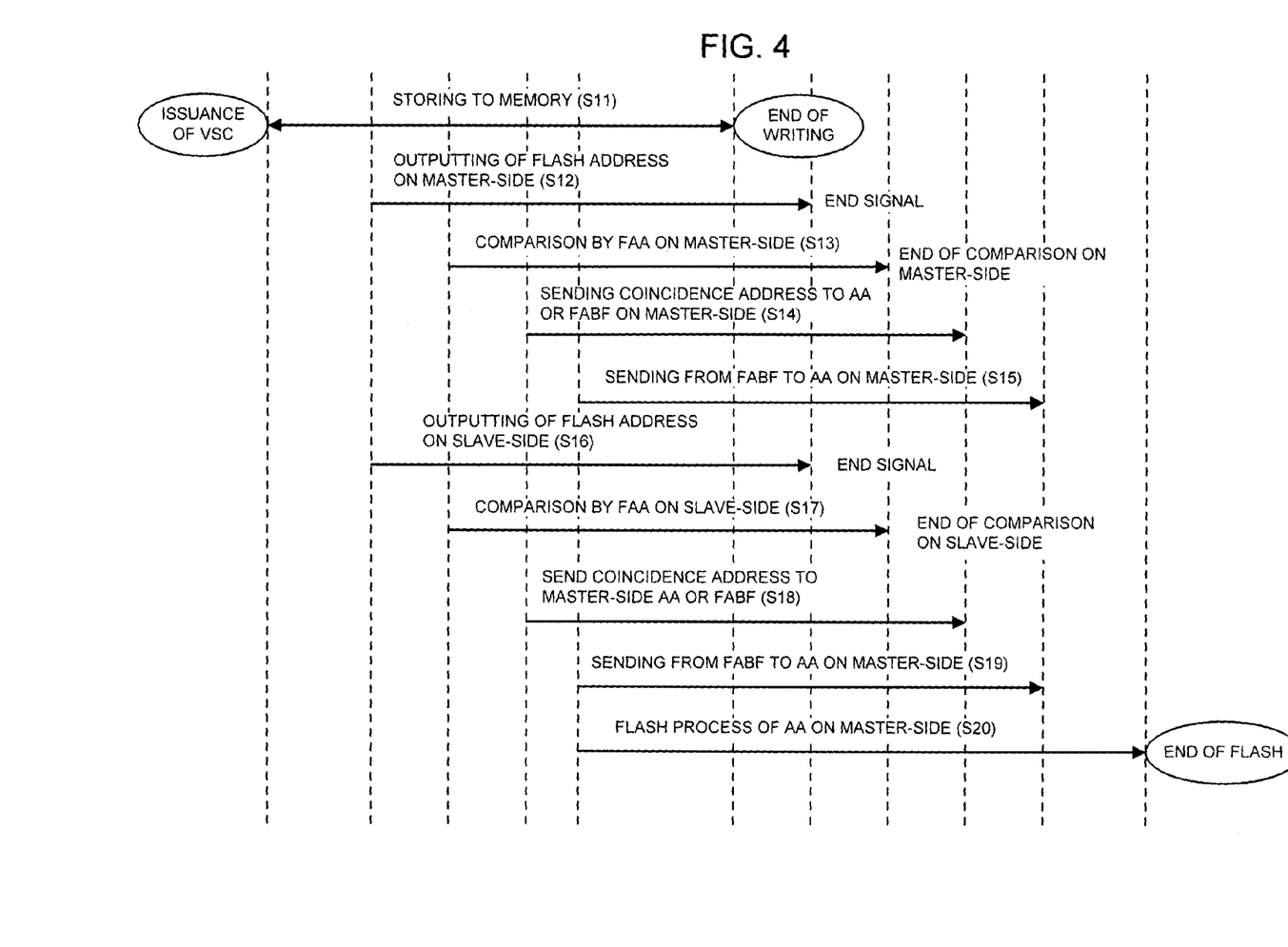
FIG. 4 is a time chart showing a cache flash control operation in the CPU in FIG. 3.

FIG. 4 is a time chart showing a cache flash control operation in the CPU 1 shown in FIG. 3. The cache flash control operation of the CPU 1 will be explained below referring to FIGS. 3 and 4.

When the VSC command is executed, an address is written to the memory unit 4 (S11 in FIG. 4). Meanwhile, the FAA 24 receives a flash address of the VSC command output from the vector register 21a (S12 in FIG. 4), thus implementing address comparison (S13 in FIG. 4).

At the same time, the FAA 34 receives a flash address of the VSC command output from the vector register 31a (S16 in FIG. 4), thus implementing address comparison (S17 in FIG. 4).

32 bits, which is the sum of an index address of 7 bits and a tag address of 25 bits, is subjected to the address comparison. When both the addresses coincide with each other, the FAA 24 outputs both the index address of 7 bits in coincidence state and the "way number" to the FABF 26 (S14 in FIG. 4). The FAA 34 outputs both the index address of 7 bits in coincidence state and the "way number" to the FABF 36 (S18 in FIG. 4).

The FABF 26 is a buffer for temporarily storing an index address of 7 bits in coincidence state and "way number" when the FABF 26 outputs an address to the address array 25 in competition with an address from the slave unit 3. The FABF 26 can be bypassed using the signal line 106 when there is no competition in address delivery. The selector 27 selects the signal line 106 (bypassed) or the signal line 107 (the output of the FABF 26).

The FABF 36 is a buffer for temporarily storing an index address of 7 bits in coincidence state and "way number" when a reduced number of signal lines 207 bottlenecks the address transfer performance at the outputting of an address from the slave unit 3 to the AA 25. When there is a sufficient address transfer performance, the FABF 36 can be bypassed with the signal lines 205. The selector 37 selects the signal line 205 (bypassed) or the signal line 206 (the output of the FABF 36).

When the address transfer performance is sufficient, both the FABF 26 and the signal line 107 may be omitted or the FABF 36, the signal line 206 and the selector 37 may be omitted. When both the FABF 26 and the FABF 36 are not used, the steps S15 and S19 in FIG. 4 are omitted.

A comparison operation is performed in the master unit 2. The FABF 26 outputs an index address of 7 bits in a coincidence state and "way number" (S15 in FIG. 4). A comparison operation is performed in the slave unit 3. The FABF 36 outputs an index address of 7 bits in a coincidence state and "way number" (S19 in FIG. 4). The selector 27 competitively adjusts both the comparison results. Thus, the AA 25 is subjected to a cache flash process (S20 in FIG. 4).

When the store addresses of all 256 vector elements of the VSC command have been completely output, the vector unit 21 outputs the END signal to the cache control circuit 23 via the signal line 105. The vector unit 31 outputs the END signal to the cache control circuit 23 via the signal line 204.

When confirming the receiving of both the END signals, the cache control circuit 23 ends the cache flash process of the VSC command, thus executing the next command. When a cache has to be updated because of an occurrence of a cache miss, both the FAA 24 and the FAA 34, being copies of the AA 25, have been updated in addition to the AA 25. For that reason, the cache control circuit 23 updates the FAA 24 using the signal line 104. The cache control circuit 23 updates the FAA 34 using the signal line 203. The cache control circuit 23 updates the AA 25 using the signal line 103.

Unlike the prior art, in the present invention having the above-mentioned configuration, the address comparison is performed using the FAA 34 (in the scalar unit 30 within the slave unit 3) and through the vector register 31a. Consequently, the flash address of the VSC command of 32 bits is not output from the slave unit 3 to the master unit 2. This feature can prevent the pins of an LSI from being greatly increased.

Because the FAAs 24, 34, and 25 are simultaneously updated at a cache miss time, the signal lines 103, 104 and 203 are required. However, if the cache miss is caused by a scalar load command, the step of simultaneously processing n elements like the vector command is not required because of one address per command. The bit length of 34 bits (=an index address of 7 bits+a tag address of 25 bits+way number (e.g. 2 bits in 2 ways) is sufficient. An increased number of pins of an LSI is small.

Since the address comparison by the FAA 24 in the master unit 2 and the address comparison by the FAA 34 in the slave unit 3 are simultaneously performed, the address comparison rate can be nearly doubled. When an address coincidence occurs, the address to be output to the AA 25 becomes 9 bits (=an index address of 7 bits+a way number (e.g. 2 bits in 2 ways)), as described previously. This bit length is very small, compared with the prior art (32 bits×n (where n is the number of vector elements to be simultaneously processed during 1T)).

In an actual program, data is often obtained of which the possibility that there is a match between a flash address representing a store address of the VSC command and a cache address is very low. Even the vector command does not require increasing the number of the signal lines 207 n times. This feature allows the number of pins of an LSI to be reduced greatly and effectively.

As described above, in the system adopting the vector unit divided into plural asynchronous operation units, according to the present invention, a cache flash control of the VSC command is performed between different asynchronously-operating units, without increasing the number of pins of an LSI. The comparison of a cache address and a flash address can be performed at high rate.

According to the present invention, the vector unit is divided into a master unit and a slave unit. Moreover, cash flash control is performed of invalidating a cache line with a command for directly accessing a memory when a mismatch between data in a cache and data in the memory occurs. In such a system, the master unit and the slave unit divisionally execute the comparison between a store address to the memory and the address to the cache. By doing so, the information processing system that executes a comparison process between a cash address and a store address of the VSC command at high rate can be effectively provided without greatly increasing the number of pins of an LSI. Moreover, the cache flash control method used for the information processing system can be provided effectively.

The entire disclosure of Japanese Patent Application No. 2002-170839 filed on Jun. 12, 2002 including a specification, claims, drawings and summary are incorporated herein by reference in its entirely.

What is claimed is:

1. An information processing system, comprising a vector unit divided into a plurality of asynchronous operation units, each of said plurality of asynchronous operation units having both a vector and a scalar portion, and performing cache flash control to invalidate a cache line by a command directly accessing a memory when a mismatch between data in said memory and data in a cache memory occurs, said plurality of asynchronous operation units divisionally comparing a flash address representing a store address to said memory with an address to said cache memory.

2. The information operating system defined in claim 1, wherein said cache flash control is performed using said flash address output from each of said plurality of asynchronous operation units.

3. An information processing system, comprising a vector unit divided into a master unit and a slave unit, said master unit and said slave unit each having both a vector and a scalar portion, and performing cache flash control to invalidate a cache line by a command directly accessing a memory when a mismatch between data in said memory and data in a cache memory occurs, said master unit and said slave unit divisionally comparing a flash address representing a store address to said memory with an address to said cache memory.

4. The information processing system defined in claim 3, wherein said slave unit outputs a coincidence flash address only in said comparison process to an address array inside said master unit.

5. A cache flash control method, wherein, with a vector unit divided into a plurality of asynchronous operation unit, each of said plurality of asynchronous operation units having both a vector and a scalar portion, cache flash control is performed to invalidate a cache line by a command directly accessing a memory when a mismatch between data in said memory and data in a cache memory occurs, said cache flash control method comprising the step of divisionally comparing a flash address representing a store address to said memory with an address to said cache memory by means of said plurality of asynchronous operation units.

6. The cache flash control method defined in claim 5, wherein said cache flash control is performed using said flash address output from each of said plurality of asynchronous operation units.

7. A cache flash control method, wherein, with a vector unit divided into a master unit and a slave unit, said master unit and said slave unit each having both a vector and a scalar portion, cache flash control is performed to invalidate a cache line by a command directly accessing a memory when a mismatch between data in said memory and data in a cache memory occurs, said cache flash control method comprising the step of divisionally comparing a flash address representing a store address to said memory with an address to said cache memory by means of said master unit and said slave unit.

8. The cache flash control method defined in claim 7, wherein said slave unit outputs a coincidence flash address only in said comparison process to an address array inside said master unit.

9. An information processing system, comprising a CPU having a vector unit divided into a plurality of asynchronous operation units, each of said plurality of asynchronous operation units having both a vector and a scalar portion; said plurality of asynchronous operation units divisionally performing cache flash control to invalidate a cache line by a command directly accessing a memory when a mismatch between data in said memory and data in a cache memory occurs, and a comparison process between a flash address representing a store address to said memory and an address to said cache memory.

10. The information operating system defined in claim 9, wherein said CPU performs said cache flash control using said flash address output from each of said plurality of asynchronous operation units.

11. An information processing system, comprising a CPU having a vector unit divided into a master unit and a slave unit, said master unit and said slave unit each having both a vector and a scalar portion; said master unit and said slave unit divisionally performing cache flash control to invalidate a cache line by a command directly accessing a memory when a mismatch between data in said memory and data in a cache memory occurs, and a comparison process between a flash address representing a store address to said memory and an address to said cache memory.

12. The information processing system defined in claim 11, wherein said slave unit outputs a coincidence flash address only in said comparison process from said slave unit to an address array inside said master unit.

13. A computer-readable medium on which a program for controlling a CPU in an information processing system is stored;
said CPU comprising a vector unit divided into a plurality of asynchronous operation units, each of said plurality of asynchronous operation units having both a vector and a scalar portion;
said program being executed such that said plurality of asynchronous operation units divisionally perform cache flash control to invalidate a cache line by a command directly accessing a memory when a mismatch between data in said memory and data in a cache memory occurs, and a comparison process between a flash address representing a store address to said memory and an address to said cache memory.

14. The computer-readable medium defined in claim 13, wherein said program is executed such that said CPU performs said cache flash control using said flash address output from each of said plurality of asynchronous operation units.

15. A computer-readable medium on which a program for controlling a CPU in an information processing system is stored;
said CPU having a vector unit divided into a master unit and a slave unit, said master unit and said slave unit each having both a vector and a scalar portion;
said program being executed such that said master unit and said slave unit divisionally perform cache flash control to invalidate a cache line by a command directly accessing a memory when a mismatch between data in said memory and data in a cache memory occurs, and a comparison process between a flash address representing a store address to said memory and an address to said cache memory.

16. The computer-readable medium defined in claim 15, wherein said program is executed such that said slave unit outputs a coincidence flash address only in said comparison process from said slave unit to an address array inside said master unit.

* * * * *